US012662325B2

(12) United States Patent

Schulte Strathaus

(10) Patent No.: US 12,662,325 B2

(45) Date of Patent: Jun. 23, 2026

(54) SYSTEM AND METHOD FOR MONITORING THE CONDITION OF A CONVEYOR BELT OF A CONVEYOR BELT SYSTEM AND A CORRESPONDING CONVEYOR BELT SYSTEM

(71) Applicant: Schulte Strathaus GmbH & Co. KG Fördertechnik Dichtungssysteme, Werl (DE)

(72) Inventor: Michael Schulte Strathaus, Wickede (DE)

(73) Assignee: Schulte Strathaus GmbH & Co. KG Fördertechnik Dichtungssysteme, Werl (DE)

( * ) Notice: Subject to any disclaimer, the term of this patent is extended or adjusted under 35 U.S.C. 154(b) by 0 days.

(21) Appl. No.: 18/616,918

(22) Filed: Mar. 26, 2024

(65) Prior Publication Data

US 2024/0228179 A1 Jul. 11, 2024

Related U.S. Application Data

(63) Continuation of application No. PCT/EP2022/078202, filed on Oct. 11, 2022.

(51) Int. Cl.
*B65G 43/02* (2006.01)
*B65G 45/16* (2006.01)

(52) U.S. Cl.
CPC ............. *B65G 43/02* (2013.01); *B65G 45/16* (2013.01); *B65G 2203/042* (2013.01)

(58) Field of Classification Search
None
See application file for complete search history.

(56) References Cited

U.S. PATENT DOCUMENTS

| | | | | |
|---|---|---|---|---|
| 5,954,186 | A | * 9/1999 | Stroobandt | ............. G01P 3/487 |
| | | | | 198/810.01 |
| 9,731,906 | B2 | * 8/2017 | Strathaus | ............... B65G 45/16 |

(Continued)

FOREIGN PATENT DOCUMENTS

| | | | |
|---|---|---|---|
| CN | 106573735 A | 4/2017 | |
| CN | 113772375 A | * 12/2021 | ............. B65G 15/32 |

(Continued)

OTHER PUBLICATIONS

International Preliminary Report on Patentability for corresponding International Application No. PCT/EP2022/078202, mailed Apr. 24, 2025.

(Continued)

*Primary Examiner* — Kavel Singh
(74) *Attorney, Agent, or Firm* — Jason H. Vick; Amped IP LLC

(57) ABSTRACT

Shown and described is a system (1) for monitoring the condition of a conveyor belt (2) of a conveyor belt system (3), with
a support shaft (4, 4'),
a scraper segment (5, 5') arranged on the support shaft (4, 4') and connected to the support shaft (4, 4') in a torque-transmitting manner,
a stationary mounting (8) with a mounting bearing (9) in which the support shaft (4, 4') is rotatably mounted,
a movement element (11) arranged on the mounting (8) and coupled to the support shaft (4, 4') in terms of movement, and
a sensor (10) for monitoring the condition of the conveyor belt (2),
wherein the scraper segment (5, 5'), the support shaft (4, 4'), the mounting (8) and the movement element (11) interact in such a way that a force acting on the scraper segment (5, 5') is transmitted to the movement element (11), and (Continued)

Figure 1:
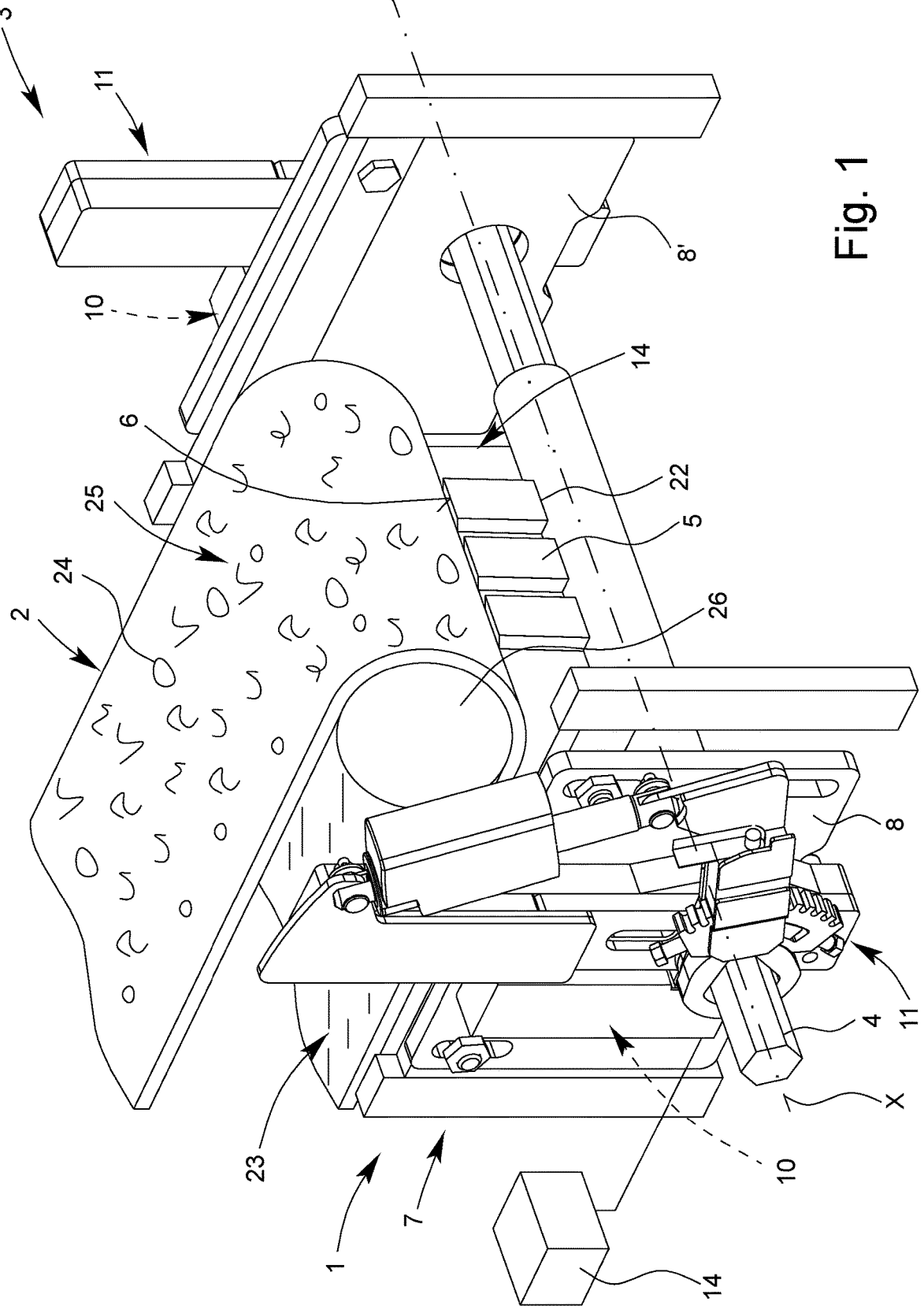

wherein the sensor (10) is arranged and designed in such a way that the sensor (10) detects a characteristic, in particular physical, variable of the movement element (11).

20 Claims, 11 Drawing Sheets

(56)                  References Cited

U.S. PATENT DOCUMENTS

| | | | |
|---|---|---|---|
| 2003/0230466 A1 | 12/2003 | Swinderman et al. | |
| 2009/0194391 A1 | 8/2009 | Lagneaux | |
| 2011/0137587 A1* | 6/2011 | Rothlisberger | B65G 43/00 |
| | | | 702/56 |
| 2011/0247426 A1 | 10/2011 | Swinderman et al. | |
| 2012/0031736 A1 | 2/2012 | Swinderman et al. | |
| 2016/0076955 A1 | 3/2016 | Miyajima et al. | |
| 2017/0174441 A1 | 6/2017 | Strathaus | |
| 2017/0299383 A1 | 10/2017 | Gouko et al. | |
| 2017/0320675 A1 | 11/2017 | Brunone | |
| 2019/0002207 A1 | 1/2019 | Schulte Strathaus et al. | |
| 2019/0016538 A1 | 1/2019 | Bogle | |
| 2019/0193946 A1 | 6/2019 | DeVries et al. | |
| 2022/0033192 A1 | 2/2022 | Weimann et al. | |

FOREIGN PATENT DOCUMENTS

| | | |
|---|---|---|
| DE | 102004014084 A1 | 10/2004 |
| DE | 112011102652 T5 | 6/2013 |
| DE | 202014007229 U1 | 7/2015 |
| DE | 112014002353 T5 | 2/2016 |
| DE | 202017106872 U1 | 2/2019 |
| DE | 102018123799 A1 | 3/2020 |
| JP | H09-221216 A | 8/1997 |
| JP | 2016-145792 A | 8/2016 |
| RU | 2758220 C1 | 10/2021 |
| RU | 2766476 C1 | 3/2022 |
| WO | WO 2019/126664 A1 | 6/2019 |

OTHER PUBLICATIONS

International Search Report for corresponding International Application No. PCT/EP2022/078202, mailed May 31, 2023.
Written Opinion for corresponding International Application No. PCT/EP2022/078202, mailed May 31, 2023.

* cited by examiner

SYSTEM AND METHOD FOR MONITORING THE CONDITION OF A CONVEYOR BELT OF A CONVEYOR BELT SYSTEM AND A CORRESPONDING CONVEYOR BELT SYSTEM

CROSS REFERENCE TO RELATED APPLICATIONS

This application is a Continuation Application of PCT Application No. PCT/EP2022/078202 having an international filing date of 11 Oct. 2022, which designated the United States, which is incorporated herein by reference in its entirety.

The invention relates to a system for monitoring the condition of a conveyor belt of a conveyor belt system. The system has a support shaft and at least one scraper segment arranged on the support shaft and connected to the support shaft in a torque-transmitting manner. In addition, the system comprises at least one stationary mounting with a mounting bearing in which the support shaft is rotatably mounted. The system also has a movement element arranged on the mounting and coupled to the support shaft in terms of movement and a sensor for monitoring the state of the conveyor belt.

Furthermore, the present invention relates to a method for monitoring the condition of a conveyor belt of a conveyor belt system using a system of the aforementioned type.

The present invention also relates to a conveyor belt system with a conveyor belt and a system of the aforementioned type.

Conveyor belt systems use a moving conveyor belt to transport bulk materials, such as sand, gravel, coal, ore or the like, from one location to another. When the bulk material falls off the conveyor belt at the end of a deflection, a residue of the bulk material sometimes sticks to the conveyor belt. A conveyor belt scraper device can comprise a scraper segment of the aforementioned type. The scraper segment is used to scrape off bulk material adhering to the conveyor belt.

Typically, a first scraper segment and/or first scraper segments are located directly on the deflection roller of the conveyor belt as so-called primary scrapers. A secondary scraper is usually located on the lower run of the conveyor belt behind the primary scraper in the direction of travel of the conveyor belt.

The scraper segments of a conveyor belt scraper device, which are usually arranged next to each other, are interchangeably attached to a usually rotatable and often also linearly adjustable support shaft, which can extend transversely to the conveyor belt.

An adjusting device can be provided. This is usually connected to one or both ends of the support shaft and can be designed to generate the necessary pre-tension for the conveyor belt scraper via a corresponding lifting structure or pre-tensioned springs. Sometimes, the adjusting device has a drive engine. The drive engine is then controlled by an electric or electronic control unit. If only one drive engine is mentioned here, this includes a variant in which several drive engines are provided, in particular one drive engine at each end of the support shaft.

In practice, control methods are known that can be used to optically monitor the condition of the conveyor belt. However, this requires a complex evaluation of the measurement results and is also prone to errors and associated with high operating, maintenance and manufacturing costs. If damage or potential damage is detected too late—for example due to adhering bulk material—this can result in damage to the entire conveyor belt system or even failure of the conveyor belt system and cause follow-up costs that are difficult to estimate. If, for example, bulk material gets into the drive system of the conveyor belt system, the damage can be considerable.

Damage to the conveyor belt should be detected as early as possible, reliably and automatically, whereby false detections (damage is assumed even though there is actually no damage) should be avoided as far as possible. Preferably, when damage occurs, its position on the conveyor belt is detected as precisely as possible.

It is therefore the task of the present invention to provide a system and/or a method for efficient and/or reliable monitoring of the condition of a conveyor belt of a conveyor belt system, in particular wherein disadvantages of the prior art are to be avoided or at least substantially reduced.

To solve this problem, the present invention provides a system for monitoring the condition of a conveyor belt of a conveyor belt system.

The system comprises a support shaft and at least one scraper segment arranged on the support shaft and connected to the support shaft in a torque-transmitting manner. A plurality of scraper segments can also be provided, which can in particular be arranged adjacent to one another on the support shaft. The scraper segments can be designed to ensure that material adhering to the conveyor belt is scraped off.

In addition, the system according to the invention comprises a stationary mounting with a mounting bearing in which the support shaft is rotatably mounted. Furthermore, a movement element of the system is arranged on the mounting, whereby the movement element is coupled to the support shaft in terms of movement. In particular, the movement element is connected to the support shaft in a rotationally fixed and/or torsionally fixed manner.

According to the invention, the system has a sensor for monitoring the condition of the conveyor belt.

The scraper segment, the support shaft and the mounting as well as the movement element interact in such a way that a force acting on the scraper segment is transmitted to the movement element, the sensor being arranged and designed in such a way that the sensor detects a characteristic, in particular a physical, variable of the movement element.

The invention makes it possible to use the sensor to monitor the condition of the conveyor belt and/or to draw conclusions about the condition of the conveyor belt, preferably for detecting damage. In tests carried out when the invention came about, it was surprisingly found that a sensor, which can be arranged in particular on the mounting, can enable conclusions to be drawn about the condition of the conveyor belt by monitoring the movement element.

In particular, for example, it can be provided that the scraper segment is in contact with the conveyor belt, whereby when contact is made with the area of the conveyor belt in which damage is present, the interaction of the scraper segment and the conveyor belt is changed in such a way that the force acting on the scraper segment as a result can be detected by means of the sensor through interaction with the movement element.

In particular, the movement element can also be movably, preferably pivotably, mounted on the mounting. Ultimately, the sensor in particular can interact with the movement element in such a way that the sensor can at least indirectly detect a change in the position of the scraper end of the scraper segment facing the conveyor belt and/or a change in the adjusting force to be applied to bring the scraper end into contact with the conveyor belt.

Preferably, a belt entrainment force applied by the conveyor belt to the scraper end of the scraper segment can be detected at least indirectly, in particular, changes in the belt entrainment force can be detected.

During the development of the invention, it was determined that these aforementioned changes could in turn indicate a belt failure.

Accordingly, the invention makes it possible to monitor the conveyor belt economically, efficiently and safely in a comparatively simple manner.

In particular, according to the invention, the sensor and the interaction of the movement element and the sensor can be used to draw conclusions about the condition of the conveyor belt, preferably for detecting damage.

The load data and/or measurement signals recorded by the sensor can, in particular, be evaluated so that, for example, a check can be carried out to see whether limit values—which in particular limit a predefined range—have been exceeded and/or fallen short of.

In particular, the invention makes it possible to identify a possible damage event in good time and, in particular, to estimate the extent of possible damage. This preferably ensures a significant reduction in the operating and maintenance costs of the entire conveyor belt system.

Preferably, a movement of the movement element can be detected at least indirectly via the sensor, whereby conclusions can be drawn about the conveyor belt by connecting the movement element to the support shaft and the support shaft in turn to the scraper segment. In particular, the sensor can be used to detect when the support shaft and/or the scraper segment undergoes such a change that the scraper segment is and/or has been brought out of contact with the conveyor belt.

In a particularly preferred embodiment of the present invention, it is provided that the system has an adjusting device by means of which the support shaft can be moved in such a way that a surface of the scraper segment, in particular a scraper end, can be brought into contact with the conveyor belt, the adjusting device being arranged and/or mounted on the holding device and also being connected to the support shaft in a torque-transmitting manner. The movement element can be coupled to the adjusting device in terms of movement or be part of the adjusting device.

In particular, the adjusting device can transfer an adjusting force to the scraper segment, which brings the scraper end into contact with the conveyor belt. In the event of conveyor belt damage and/or belt damage, this adjusting force to be applied by the adjusting device can change, in particular increase. Such a change in the adjusting force to be applied can then be detected according to the invention, in particular by means of the movement element and by means of the sensor.

The adjusting device can preferably be arranged and/or mounted on the mounting—in particular outside the conveyor belt—preferably at least indirectly on a deflection roller of the conveyor belt.

In particular, the sensor can detect when the scraper segment is and/or has been brought out of contact with the conveyor belt and the adjusting force has changed and/or altered as a result.

Finally, the adjusting device can apply a pretensioning force to the support shaft, which in turn brings the scraper segment with its scraper end into contact with the conveyor belt with a desired pretension. In particular, the pretension must be high enough to reliably scrape off any bulk material residue adhering to the conveyor belt, but preferably it must not be too high so that the conveyor belt is not damaged by the scraper segment.

The adjusting device can interact with one or a plurality of scraper segments.

In particular, the adjusting device is arranged on and/or connected to the support shaft and therefore interacts with the scraper segment(s) arranged on the support shaft.

In particular, the movement element can be designed as a freely rotatable lever mounted on the mounting or as a freely rotatable pendulum mounted on the mounting.

Preferably, the movement element is connected to the support shaft in a rotationally fixed and/or torsionally fixed manner, as explained above. In a particularly preferred embodiment, such an arrangement of the movement element enables the movement element to be coupled to the scraper segment in terms of movement, in particular also via the support shaft, namely in particular also when the scraper segment is connected to the support shaft in a rotationally fixed manner. Thus, the connection via the support shaft makes it possible to detect such a change in the scraper segment and/or to detect it via the sensor, which indicates damage to the conveyor belt.

Alternatively or additionally, it may be provided that the movement element is connected to the support shaft in such a way that a load on the support shaft causes a translatory movement of the movement element. Such an arrangement and/or connection between the movement element and the support shaft makes it possible to monitor the condition of the conveyor belt at least indirectly due to the interaction between the support shaft and the scraper segment and, on the other hand, due to the interaction between the movement element and the support shaft by means of the sensor based on the translational movement of the movement element.

Ultimately, a change in the translational movement of the movement element can indicate damage to the conveyor belt after corresponding evaluation, which can be determined by the measurement data recorded by the sensor.

In a further preferred embodiment of the invention, it can be provided that the sensor and the movement element are arranged and designed in such a way that when the movement element is moved, the movement element exerts a force on the sensor, in particular presses against the sensor or pulls the sensor.

In the normal and/or unloaded state of the movement element, it can be provided that the movement element is out of engagement with the sensor.

In principle, however, it is also possible in other embodiments for the movement element to be in contact with the sensor even in the normal and/or unloaded state.

By exerting a force, the sensor in particular can determine whether there is damage to the conveyor belt and thus monitor the condition of the conveyor belt. In particular, a change in the force can be detected, which in turn can allow conclusions to be drawn about the condition of the conveyor belt.

Preferably, the sensor is arranged and designed in such a way that the sensor detects a force exerted on the sensor by the movement element. By detecting this force, the sensor is able to detect measurement signals, which in turn can be used to evaluate and determine the condition of the conveyor belt. The force can be recorded directly or indirectly. Indirect detection of the force means in particular that the sensor can detect a physical variable that correlates with the force exerted.

In another preferred embodiment, the sensor is arranged and designed in such a way that the sensor detects a change in the position or angular orientation of the movement element or an acceleration of the movement element. In such a configuration of both the movement element and the sensor, a translational and rotational movement of the movement element and/or an acceleration can be detected in particular. This means that, as an alternative or in addition to the force, the deflection of the movement element or a change in the movement of the movement element can also be used to detect damage. The sensor can therefore be designed in different ways, but in each case allows conclusions to be drawn about the condition of the conveyor belt.

In a particularly preferred embodiment, the sensor has a strain gauge or is designed as a strain gauge, force sensor, piezoelectric sensor, potentiometer, angle sensor, acceleration sensor or magnetic proximity sensor. The aforementioned forms of the sensor make it possible to monitor the condition of the conveyor belt through the interaction between the movement element and the sensor. According to the invention, it has been found that different measuring principles can be used to determine the condition of the conveyor belt, in particular by changing the force exerted on the scraper segment. Ultimately, the sensor is designed in particular in such a way that conveyor belt damage can be detected.

The design of the sensor as a strain gauge is particularly preferred, as it can ensure an efficient, cost-effective and reliable measurement method. With a strain gauge, the force exerted on the sensor by the movement element can be recorded at least indirectly. The force in question can therefore be used to draw conclusions about the condition of the conveyor belt.

Preferably, alternatively or additionally, the sensor is designed in such a way that a deflection of the movement element can be measured, in particular where the sensor is designed as an optical sensor or ultrasonic sensor. The deflection of the movement element, which can be detected at least indirectly via the sensor, can also serve as a conclusion for the condition of the conveyor belt and for a change in the scraper segment.

More preferably, the sensor is arranged in a fixed position on the mounting. A stationary/fixed arrangement of the sensor on the mounting makes it possible for the sensor to interact with the movement element in a comparatively simple manner, in particular where the sensor is arranged adjacent to the movement element. The sensor can preferably be adjacent to the movement element. The movement element can in turn be movably, in particular rotatably, mounted on the mounting. In this way, the mounting can ensure interaction between the sensor and the movement element.

Preferably, the sensor is arranged in a housing of the mounting. The housing can at least partially surround the sensor and preferably protects the sensor from external influences and/or mechanical damage. Furthermore, the housing can ensure that the sensor is protected from dirt that accumulates in the area of the deflection roller, particularly during operation of the conveyor belt system. Accordingly, the wear resistance of the sensor can be improved.

The movement element can preferably have a protrusion for interacting with the sensor. Preferably, an outer edge of the movement element, preferably of the protrusion, facing the sensor is shaped in the form of a circular arc section or at least essentially in the form of a circular arc section. Such a design can ensure detection of either the deflection or the force of the movement element exerted on the sensor in a comparatively simple manner when the movement element is rotated.

Advantageously, the system has a restoring means, preferably a spring means, which is arranged on the mounting and exerts a restoring force on the movement element when the movement element moves. The restoring means can thus ensure that the movement element returns to its original position when it is moved accordingly. Ultimately, however, the restoring means can also be provided so that the restoring force applied by the restoring means must first be overcome in order for a movement of the movement element to occur. This can thus lead to the initiation of the movement of the movement element and, in particular, ensure that not every slight change in the adjusting force applied to the scraper end is detected, but preferably only a certain minimum amount of change in the scraper segment is detected. Ultimately, the restoring means can be used to specify a lower limit that must first be overcome.

In a particularly preferred embodiment of the invention, it is provided that the system has a communication device for transmitting information recorded by the sensor. This communication device can be arranged at a distance from and/or outside the mounting. The communication device can also be arranged outside the conveyor belt. Accordingly, the communication device can also be regarded as an external communication device.

In another embodiment, the communication device can also be cloud-based.

Preferably, however, the communication device is a physical device located in the vicinity of the conveyor system and/or the conveyor belt, which evaluates the information recorded by the sensor to monitor the condition of the conveyor belt. Ultimately, the communication device can evaluate the information recorded by the sensor and thus monitor the condition of the conveyor belt. Preferably, the evaluation can be carried out in such a way that damage to the conveyor belt can be detected by the communication device. For this purpose, the information recorded by the sensor can also be compared with limit values stored in the communication device.

Preferably, the communication device is connected to the sensor by wire. In further embodiments, it can also be provided that a wireless connection enables simple transmission of the measurement signals from the sensor.

The system particularly preferably has a measuring device for detecting the speed of the conveyor belt, the running direction of the conveyor belt and/or the position of the conveyor belt. In particular, the measuring device can have a measuring roller. The measuring roller can be arranged on the conveyor belt, preferably below the conveyor belt. The measuring roller can make it possible to detect the speed of the conveyor belt, preferably by the moving conveyor belt also moving and/or entraining the measuring roller, preferably by transmitting a torque to the measuring roller, whereby the speed of the conveyor belt can in turn be determined by the rotational speed of the measuring roller.

In addition, inductive sensors of the measuring device can be arranged on the measuring roller. In particular, these inductive sensors can interact with an indicator means, which can be arranged on the conveyor belt. The indicator means can, for example, be a metal strip arranged on the conveyor belt. This can enable the position of the conveyor belt to be determined, for example by linking the position of the indicator means with the speed of the conveyor belt. The direction of travel of the conveyor belt can in turn be determined by the direction of rotation of the measuring roller.

In a further preferred embodiment, it is provided that the measuring device is connected to the communication device for transmitting information recorded by the measuring device. Preferably, this allows the communication device to be designed in such a way that information received from the measuring device and from the sensor is linked and/or can be linked by the communication device in such a way that the position of damage to the conveyor belt can be detected. Such a detection of the position can be made possible, for example, by using the interaction between the inductive sensors and the indicator means. In principle, however, the position can also be determined in other ways.

Linking the measurement data from both the measuring device and the sensor enables an operator of the conveyor belt system to detect damage comparatively quickly so that this conveyor belt damage can also be rectified promptly. This reduces the costs and effort required to maintain the conveyor belt system.

Preferably, the system has a control device for controlling the conveyor belt system. The communication device can be connected to the control device in such a way that, if damage to the conveyor belt is detected by the communication device, the control device switches off the conveyor belt and/or the conveyor belt system and/or releases the scraper segment from the conveyor belt. This enables the user of the conveyor belt system to prevent further damage to the conveyor belt and to intervene relatively quickly to rectify the damage to the conveyor belt. The control device thus leads to increased safety of the entire conveyor belt system.

In a further preferred embodiment of the invention, it is provided that a manual coupling is arranged on the support shaft and preferably on the adjusting device, using which the rotational position of the support shaft and preferably of the movement element can be manually adjusted and fixed in the respective set rotational position. In particular, the scraper segment can be adjusted to the conveyor belt or released from the conveyor belt by adjusting the manual coupling accordingly. The manual coupling thus allows an outsider to easily intervene to change the position of the scraper segment.

Preferably, the adjusting device has a drive element of an electric drive engine arranged in a fixed position on the mounting, which is coupled to the support shaft in a torque-transmitting manner. Preferably, the drive element is connected to the movement element in a rotationally fixed manner. The drive engine can also be provided in addition to the manual coupling or used as an alternative to it.

An adjusting device without a drive engine can also be provided according to the invention, in which case the pre-tensioning forces acting on the scraper segment can be applied by the adjusting device.

The invention also relates to a method for monitoring the condition of a conveyor belt of a conveyor belt system. The method comprises, on the one hand, providing a system according to one of the aforementioned embodiments. Furthermore, according to the method and the invention, a characteristic variable of the movement element is detected. This characteristic variable of the movement element is detected in the previously described and particularly advantageous manner.

It is therefore understood that, with regard to preferred embodiments and advantages of the method according to the invention, reference may be made to the aforementioned advantages and preferred embodiments of the system, which may also apply to the method according to the invention in the same way. Ultimately, the method according to the invention involves monitoring the condition of the conveyor belt of the conveyor belt system, using the system according to the invention. It has already been explained in connection with the description of the system how such a monitoring method can be carried out, so that, in order to avoid unnecessary repetition, no further explanation in this regard is necessary.

In the method according to the invention, the support shaft is preferably moved in such a way that a surface of the scraper segment is in contact with the conveyor belt. In particular, when the characteristic value of the movement element is captured, the scraper segment is in contact with the conveyor belt.

Different measuring methods or principles can be used to measure the characteristic size of the movement element, which in turn allows conclusions to be drawn about possible damage to the conveyor belt. In a first preferred embodiment, when the movement element moves, the movement element exerts a force on the sensor, in particular the movement element presses against the sensor or pulls the sensor. This force and/or a variable correlating to this force can in particular be the characteristic variable to be detected by the sensor.

In another preferred embodiment, a force exerted by the movement element on the sensor, a change in the position or angular position of the movement element or an acceleration of the movement element is detected.

Alternatively or additionally, a deflection of the movement element can be measured.

The aforementioned measuring methods make it possible, in particular, to monitor the condition of the conveyor belt by detecting the characteristic value of the movement element.

In a particularly preferred embodiment of the method, it is provided that the communication device evaluates the information recorded by the sensor to monitor the condition of the conveyor belt. The evaluation is carried out in particular in such a way that damage to the conveyor belt can be detected by the communication device. Thus, the method according to the invention can in particular ensure damage detection on the conveyor belt.

It is preferable for the measuring device to at least indirectly detect the speed of the conveyor belt, the direction of travel of the conveyor belt and/or the position of the conveyor belt. The measuring device can use the measuring roller and/or the inductive sensors as well as the indicator means for this purpose, as already explained at the beginning.

Furthermore, the present invention relates to a conveyor belt system with a conveyor belt and a system according to one of the aforementioned embodiments.

Also with regard to the conveyor belt system according to the invention, it is understood that, in order to avoid unnecessary explanations, explicit reference may be made to the explanations concerning the method and/or the system, which also apply in the same way to the present invention of the conveyor belt system, without this requiring further explicit mention.

Further features, advantages and possible applications of the present invention are apparent from the following description of embodiments based on the drawing and the drawing itself. All the features described and/or illustrated form the object of the present invention, either individually or in any combination, irrespective of their summary in the claims or their relationship to one another.

Figure 2:
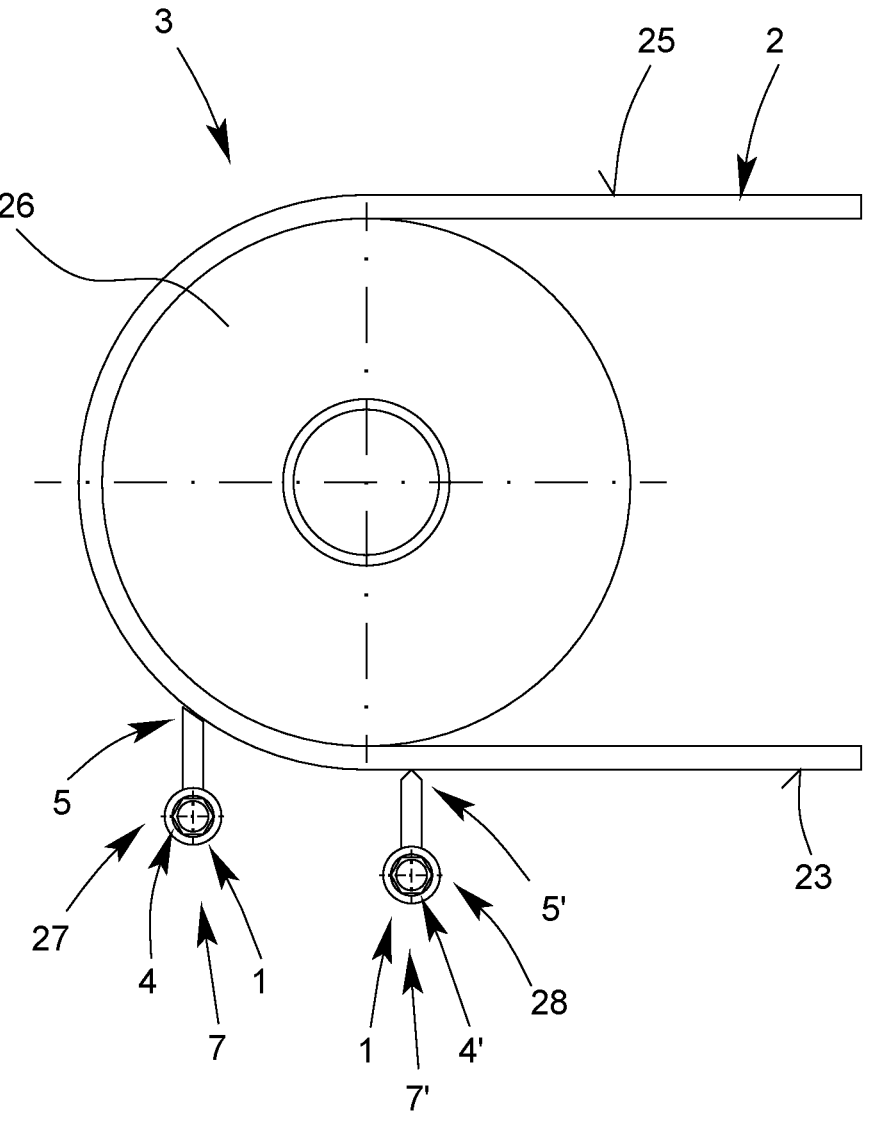
Figure 3:
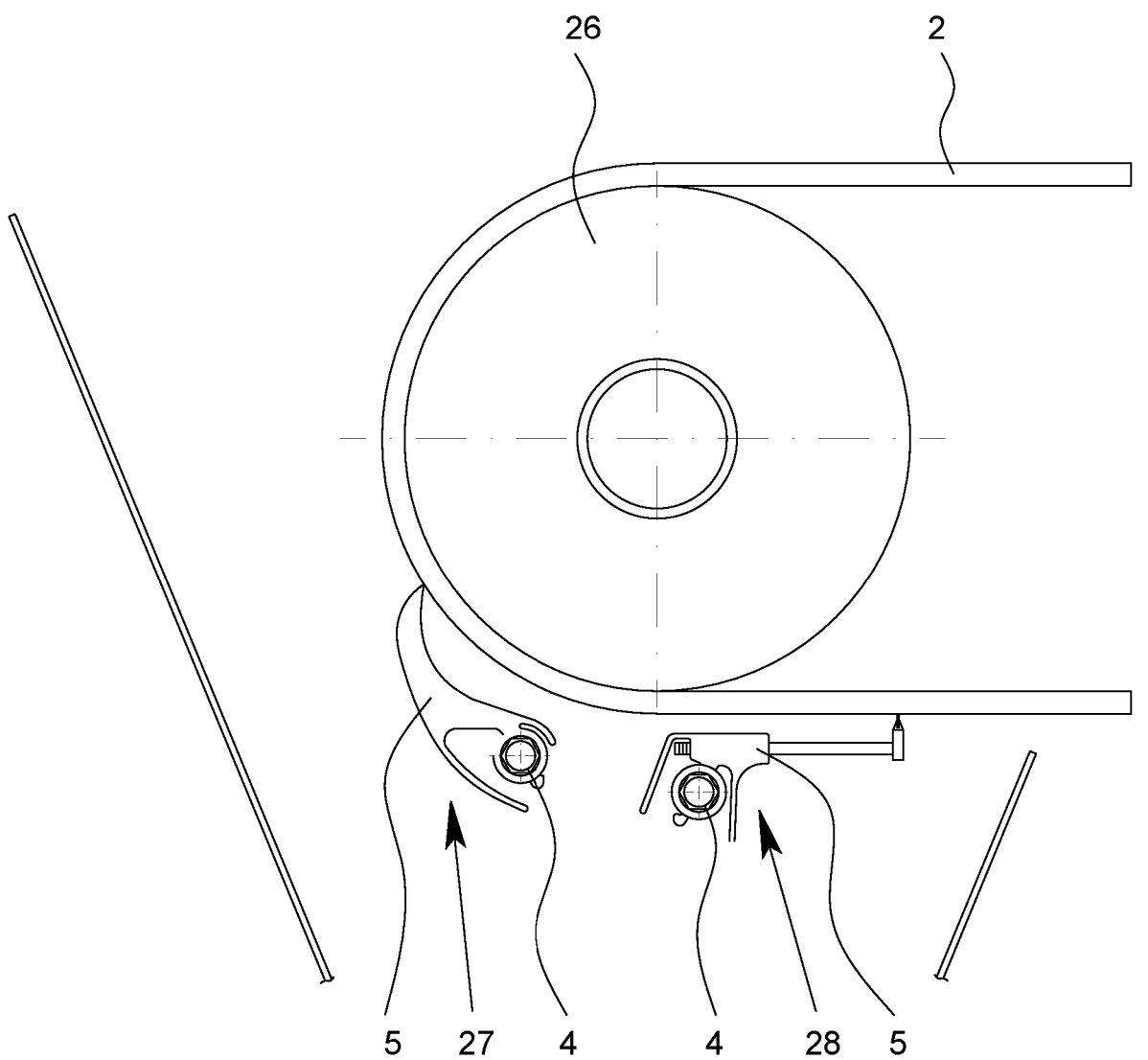
Figure 4:
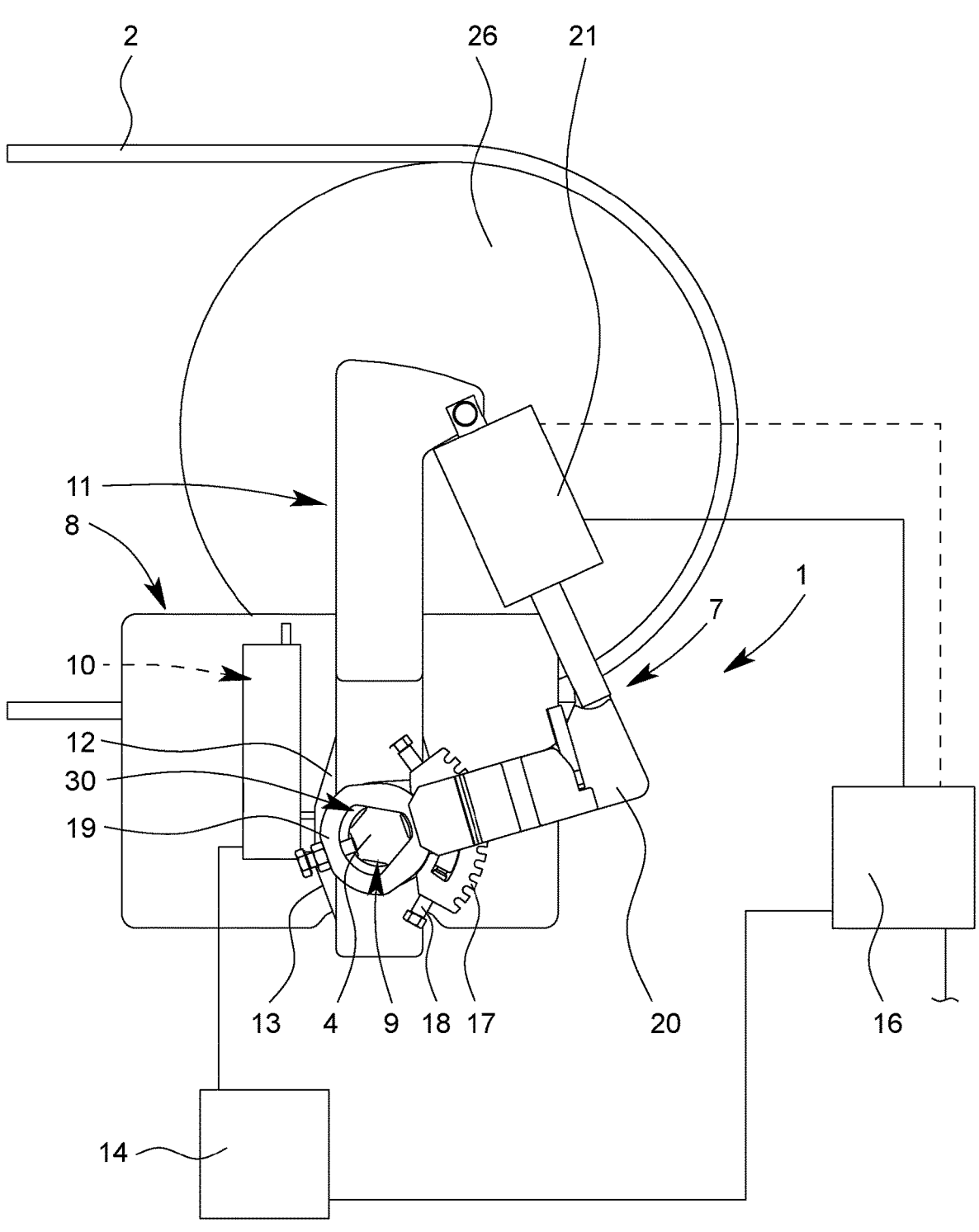
Figure 5:
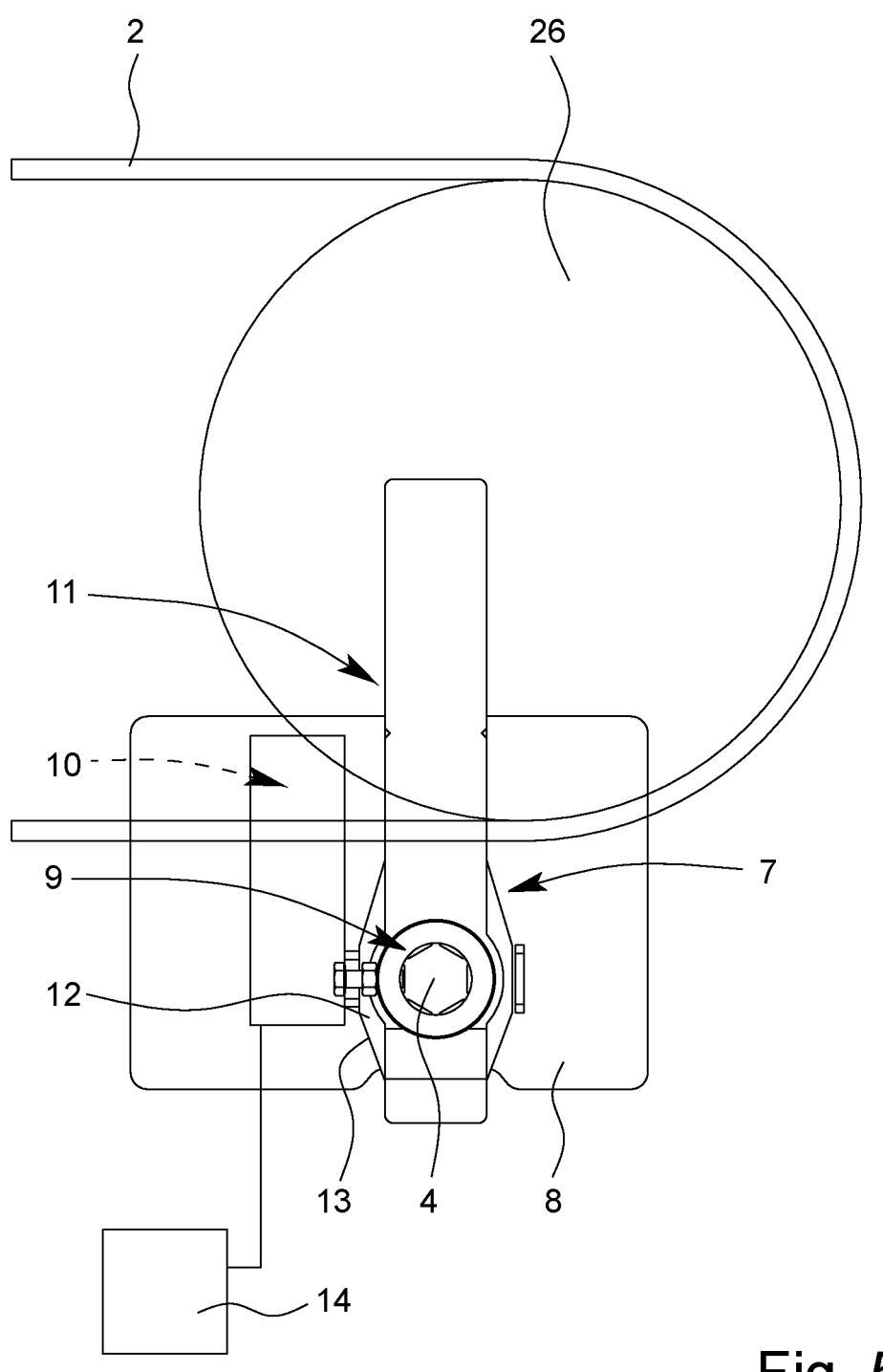
Figure 6:
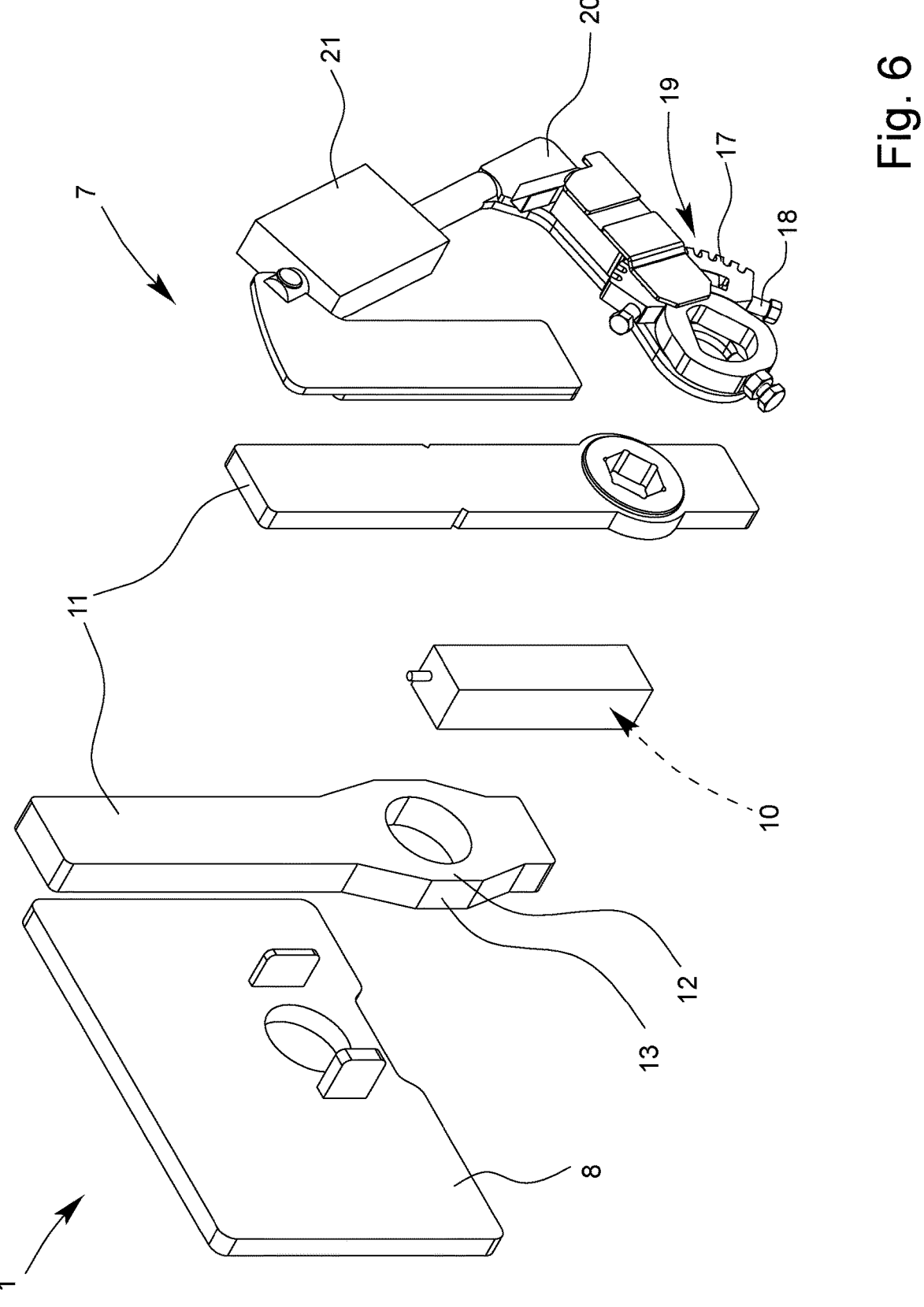
Figure 7:
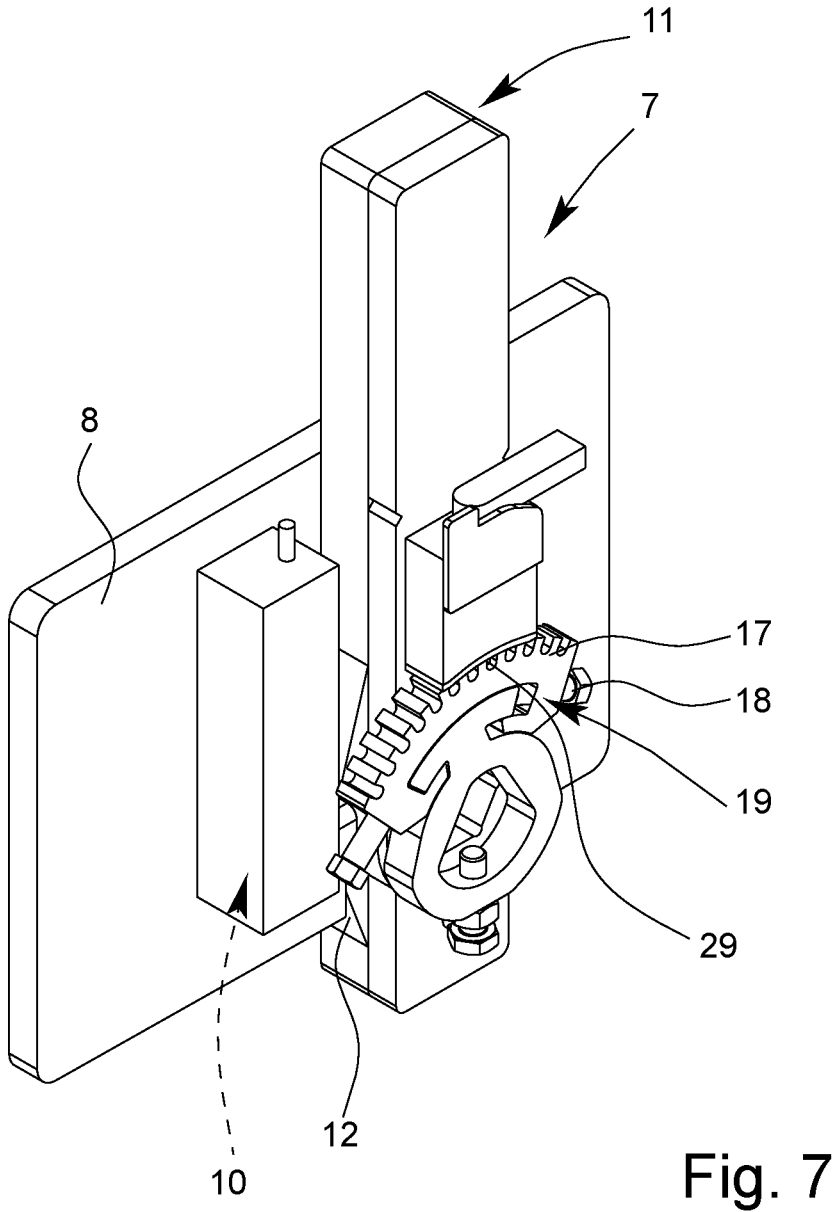
Figure 8:
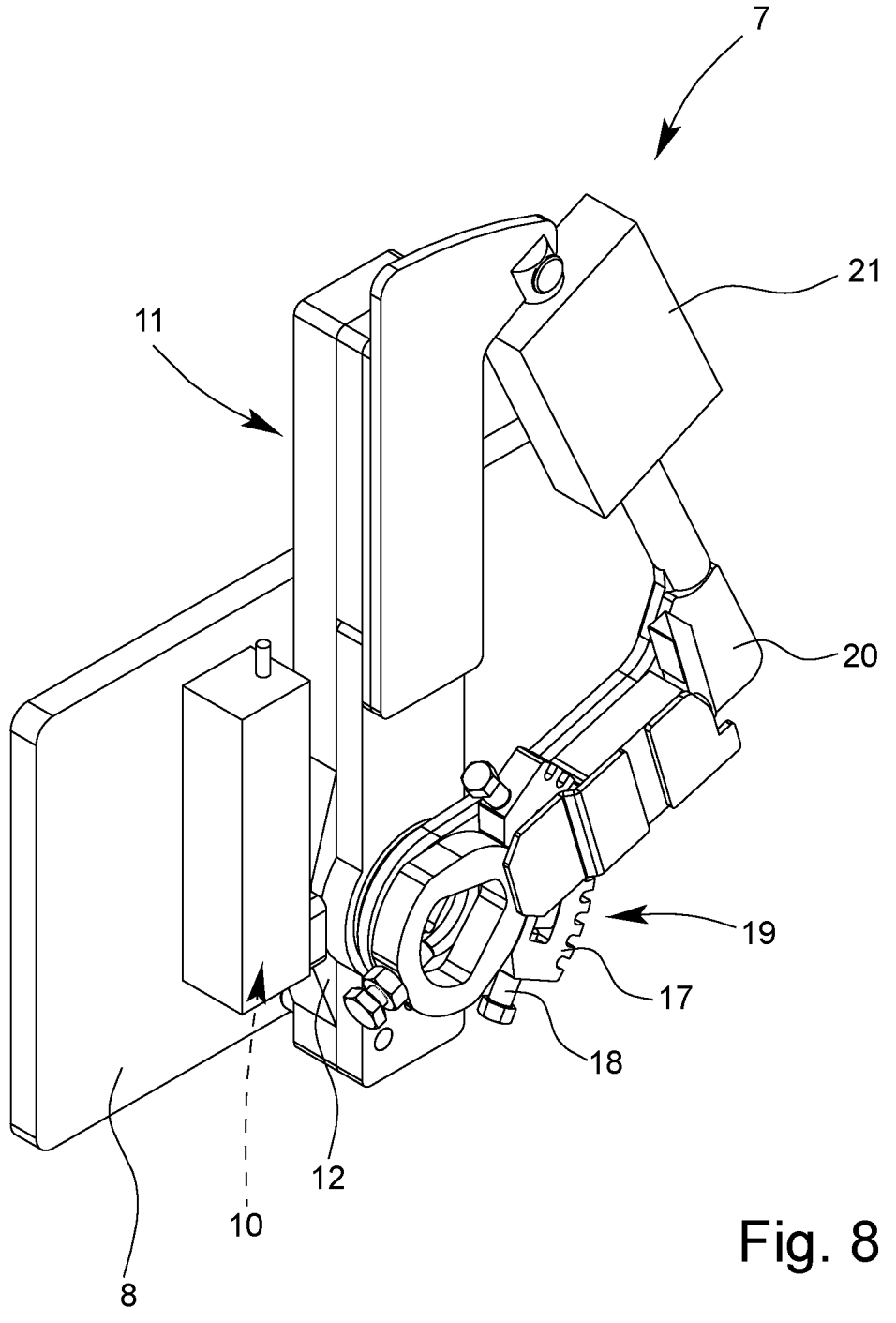
Figure 9:
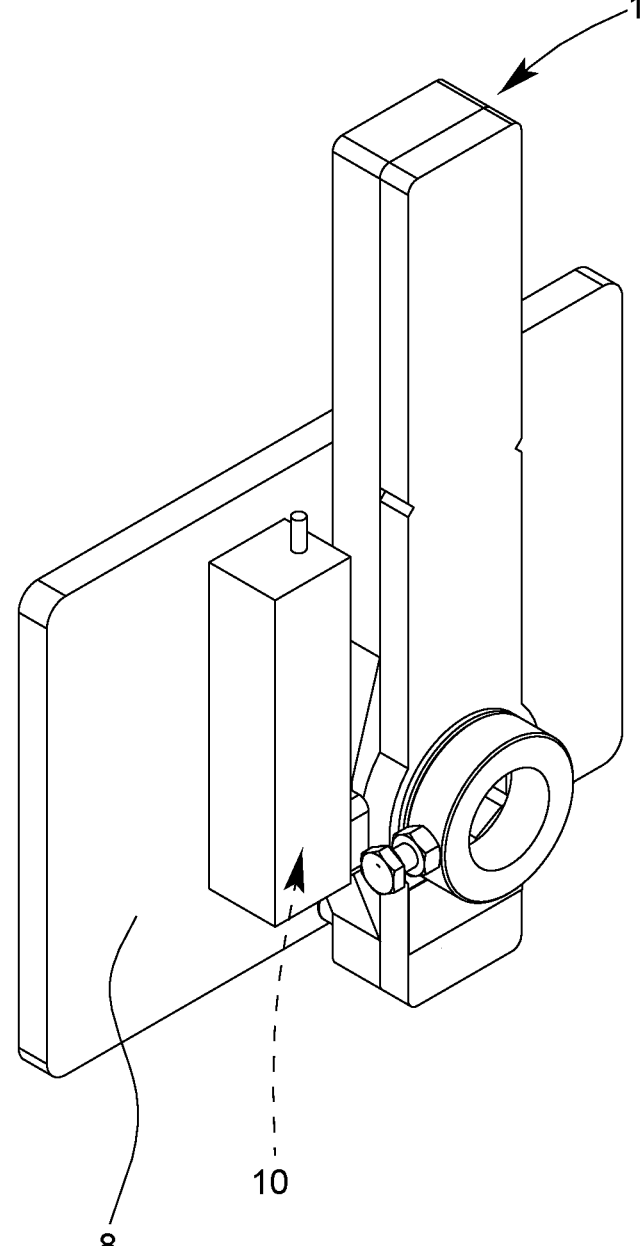
Figure 10:
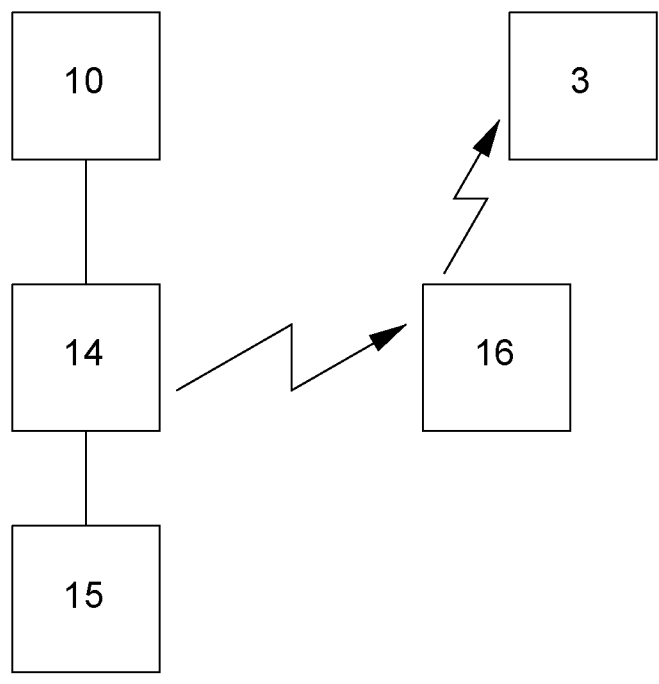
Figure 11:
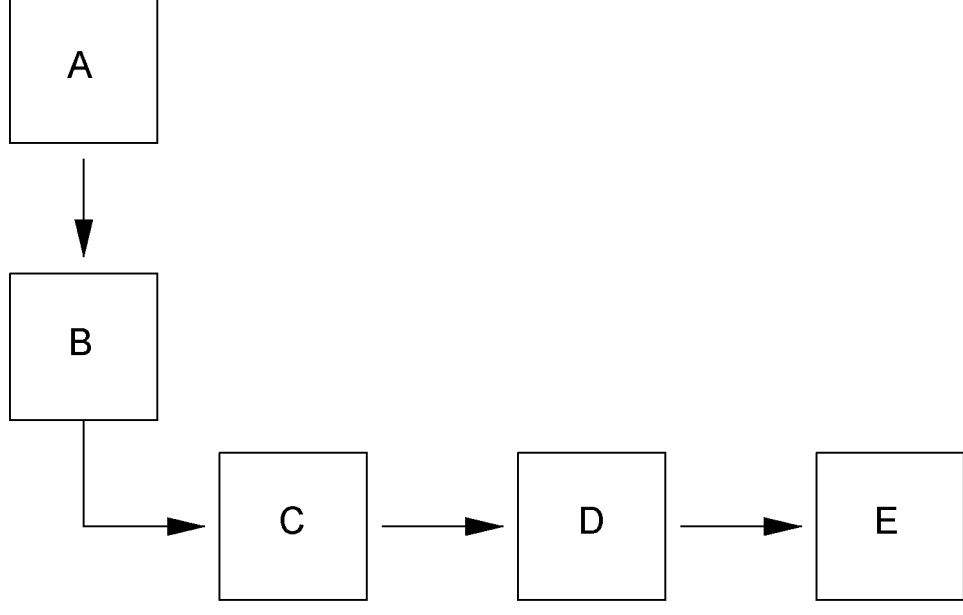
Figure 12:
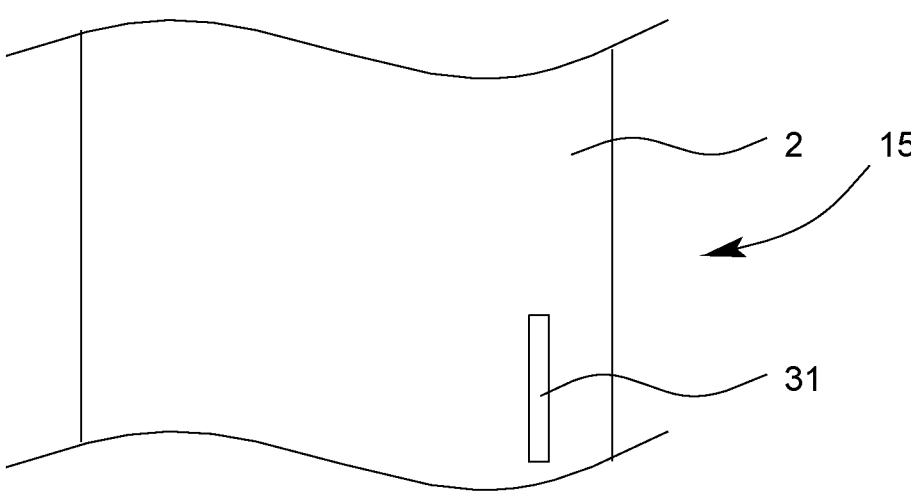
Figure 13:
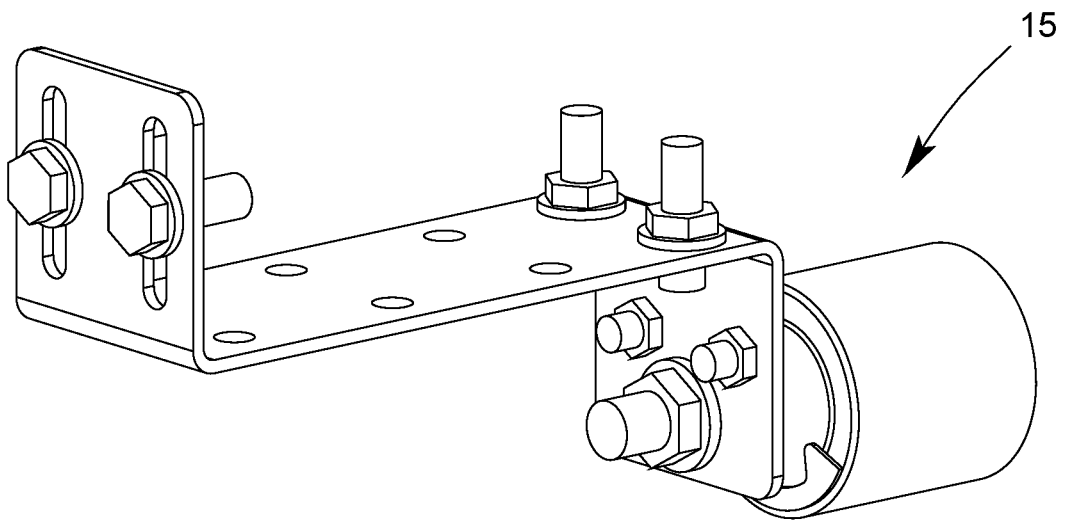

It shows:

FIG. 1 a schematic perspective view of a conveyor belt system according to the invention, FIG. 2 a schematic side view of parts of a further embodiment of a conveyor belt system according to the invention, FIG. 3 a schematic side view of parts of a further embodiment of a conveyor belt system according to the invention, FIG. 4 a schematic side view of parts of a further embodiment of a conveyor belt system according to the invention, FIG. 5 a schematic side view of parts of a further embodiment of a conveyor belt system according to the invention, FIG. 6 a schematic perspective exploded view of parts of a system according to the invention, FIG. 7 a schematic perspective view of parts of a further embodiment of a system according to the invention, FIG. 8 a schematic perspective view of parts of a further embodiment of a system according to the invention, FIG. 9 a schematic perspective view of parts of a further embodiment of a system according to the invention, FIG. 10 a schematic representation of the interaction of certain components of a further embodiment of a system according to the invention, FIG. 11 a schematic representation of a method according to the invention, FIG. 12 a schematic bottom view of a conveyor belt according to the invention and FIG. 13 a schematic perspective view of a measuring device according to the invention.

FIG. 1 schematically shows a conveyor belt system 3 with a conveyor belt 2, in which a first embodiment of a system 1 according to the invention is used to monitor the condition of the conveyor belt 2.

FIG. 1 shows—in a schematic representation—the front end of the conveyor belt system 3 in the conveying direction for conveyed material 24. The conveyed material 24 can also be referred to as bulk material. The conveyor belt 2 has a conveyor belt section 25 and an underlying return section 23 (lower run). The conveyor belt 2 is arranged endlessly in the conveyor belt system 3. The conveyor belt 2 runs around a deflection roller 26 in the transition area from the conveyor belt section 25 to the return section 23.

A drive, not shown in detail, is connected to the conveyor belt 2 and is intended to drive the conveyor belt 2.

Conveyed material 24 is schematically indicated on the conveyor belt 2—specifically at the top of its conveyor belt section 25—in FIG. 1. For example, bulk material such as sand, gravel, coal, ore or the like can be transported as conveyed material 24.

Below the conveyor belt 2 and not far from the deflection roller 26, a support shaft 4 of the conveyor belt system 3 and the system 1 can be seen. The cross-section of the support shaft 4 can have a hexagonal shape. By way of example, three scraper segments 5 are arranged on the support shaft 4. The scraper segments 5 can ultimately be arranged on the carrier shaft 4 in different ways.

At least one scraper segment 5 is arranged on the support shaft 4—and is connected to the support shaft 4 in a torque-transmitting manner. In particular, the scraper segment 5 (singular here also stands for plural) is positively connected to the support shaft 4 in a torque-transmitting manner. The scraper segment 5 can have a scraper end 6 located opposite a holding end 22. FIG. 1 shows a so-called primary scraper 27, in which the scraper end 6 of the scraper segment 5 is positioned on the lower run and/or in the area of the return section 23 at least substantially below the deflection roller 26 on the conveyor belt 2.

FIG. 2 shows a primary scraper 27 and a so-called secondary scraper 28.

FIG. 1 also shows a mounting 8, which is preferably arranged in a fixed position and in which the support shaft 4 is rotatably mounted in the illustrated embodiment example. The support shaft 4 can be rotatably mounted on the mounting 8 via a mounting bearing 9. The rotatable mounting of the support shaft can be provided in particular about the longitudinal axis X of the support shaft 4, as shown schematically in FIG. 1.

The system 1 also comprises a movement element 11. The movement element 11 is arranged on the mounting 8 and is coupled to the support shaft 4 in terms of movement. In particular, the movement element 11 according to the preferred embodiment shown in FIG. 1 is non-rotatably connected to the support shaft 4.

Alternatively or additionally, it may be provided that the movement element 11 is connected to the support shaft 4 in such a way that a load on the support shaft 4 causes a translatory movement of the movement element 11.

The system 1 also includes a sensor 10, as shown schematically in FIG. 1, but also in FIG. 6 and FIGS. 7 to 9. The sensor 10 is designed to monitor the status of the conveyor belt 2.

According to the preferred embodiment shown in FIG. 1 and in the further preferred embodiments, it is provided that the scraper segment 5 (both singular and plural are meant here), the support shaft 4, the mounting 8 and the movement element 11 interact in such a way that a force acting on the scraper segment 5 is transmitted to the movement element 11, the sensor 10 being arranged and designed in such a way that the sensor 10 detects a characteristic, in particular physical, variable of the movement element 11.

This variable detected by the sensor 10 can then be used to draw conclusions about the condition of the conveyor belt 2 and monitor it accordingly.

For example, the sensor 10 can be designed in such a way that a change in the position of the movement element 11 is detected, which in turn allows conclusions to be drawn about the state of the conveyor belt 2. For example, the belt entrainment force exerted by the conveyor belt 2 on the scraper segment 5 and/or the scraper end 6 changes. In particular, the belt entrainment force exerted on the scraper end 6 changes in the event of belt damage to the conveyor belt 2.

In the event of belt damage, the scraper segments 5 can be moved away from the conveyor belt 2, which in turn leads to a movement of the support shaft 4, which in turn leads to a movement of the movement element 11. Accordingly, the interaction and/or coupling between the scraper segment 5 and the movement element 11 and the detection of the characteristic value/variable of the movement element 11 can be used to draw conclusions about the position of the movement element 11 and/or the force exerted by the conveyor belt 2 on the scraper segment 5.

Alternatively or additionally, it can also be provided that the characteristic variable detected by the sensor 10 can enable a conclusion to be drawn about the adjusting force to be applied to the conveyor belt 2 to actuate the scraper segments 5, which can be applied via an adjusting device 7, for example.

In the preferred embodiment example shown in FIG. 1, it is provided that the system 1 further comprises an adjusting device 7. By means of the adjusting device 7, the support shaft 4 can be moved in such a way that a surface of the scraper segment 5, in particular the scraper end 6, can be brought into contact with the conveyor belt 2, wherein the adjusting device 7 is arranged on the mounting 8 and is connected to the support shaft 4 in a torque-transmitting manner. The movement element 11 can be coupled to the adjusting device 7 in terms of movement or be part of the adjusting device 7.

The adjusting device 7 can be motor-driven, as shown in FIG. 1, but does not have to be. In this context, FIGS. 7 and 9 show an embodiment of the adjusting device 7 or FIG. 9 of parts of the adjusting device 7 in which there is no drive engine 21. In this case, for example, the adjustment can be made via a manual coupling 19, as will be explained later. The adjusting device 7 can then also be operated manually in particular and include spring arrangements or similar to hold the scraper segment 5 in place.

FIG. 6 shows a schematic exploded view of the movement element 11. The movement element 11 can be designed as several parts or in one part. FIG. 6 shows that in the illustrated and preferred embodiment, a multi-part design of the movement element 11 is provided, whereby the components of the movement element 11 can be non-rotatably connected to each other in the installed state, as shown schematically in FIG. 8. According to the embodiment shown in FIG. 6, the movement element 11 is also a component of the adjusting device 7.

In the preferred embodiment shown in FIG. 1, it is provided that the sensor 10 and the movement element 11 are arranged and designed in such a way that when the movement element 11 moves, the movement element 11 exerts a force on the sensor 10, in particular presses against the sensor 10.

Preferably, the sensor 10 can be arranged and designed in such a way that the sensor 10 can detect a force exerted on the sensor 10 by the movement element 11. The force can be detected directly or indirectly. In particular, variables can also be determined that correlate with the force exerted by the movement element 11 on the sensor 10.

In particular, the sensor 10 is arranged and designed in such a way that the sensor 10 can detect a change in the position or angular orientation of the movement element 11 or an acceleration of the movement element 11. This is provided for in embodiments not shown in more detail.

In the preferred embodiment shown in FIG. 1, the sensor 10 can be designed as a strain gauge. In further embodiments, the sensor 10 can also have a strain gauge or be designed as a force sensor, piezoelectric sensor, potentiometer, angle sensor, acceleration sensor or magnetic proximity sensor.

In a further embodiment, not shown in detail, it is provided that a deflection of the movement element 11 can be measured, in particular if the sensor 10 is designed as an optical sensor or ultrasonic sensor.

In the preferred embodiment example shown in FIG. 4, the sensor 10 is arranged in a fixed position on the mounting 8.

FIG. 2 shows that ultimately two adjusting devices 7 and 7' are provided both for the primary scraper 27 and for the secondary scraper 28. In this context, it is understood that the aforementioned remarks on the adjusting device 7 of the primary scraper 27, as shown schematically in FIG. 1, can also apply in the same way to the adjusting device 7' of the secondary scraper 28, without the need for further explanation. Ultimately, the system 1 can be provided both on the primary scraper 27 and on the secondary scraper 28 and, in particular, can be designed in accordance with the embodiments described above and below.

The system 1 of the secondary scraper 28 can then also have a support shaft 4' and at least one scraper element 5', which is arranged on the support shaft 4'.

FIG. 6 schematically shows that, according to a depicted and preferred embodiment example, the movement element 11 has a protrusion 12 for interacting with the sensor 10, which is shown in more detail in particular in FIG. 8. In particular, an outer edge 13 of the movement element 11 and/or of the protrusion 12 facing the sensor 10 is at least substantially arcuate and/or curved and/or angled. Such a design of the outer edge 13 makes it possible for a movement and/or a force of the movement element 11 to be detected by the sensor 10 in a comparatively simple manner, which makes it possible to draw conclusions about the state of the conveyor belt 2. The protrusion 12 thus ensures that the entire movement element 11 does not have to touch and/or strike the sensor 10, but in particular a predetermined area, which can be designed according to the type of sensor 10.

The protrusion 12 can be designed in such a way that, for example, a minimum force or a minimum distance must be overcome before interaction with the sensor 10, which has been determined in particular on the basis of tests carried out when the invention came about. If such a distance or such a force is overcome, damage to the conveyor belt 2 must be assumed. The sensor 10 should then also detect a movement and/or a force of the movement element 11, so that belt damage can be detected in good time.

It is not shown in more detail that the preferred system 1 shown in FIG. 1 has a restoring means which is arranged on the mounting 8 and exerts a restoring force on the movement element 11 when the movement element 11 moves. Such a restoring means can thus ensure that, after the movement element 11 has been deflected, renewed belt damage and renewed belt damage detection can be ensured via the movement means 11 and through the interaction between the movement means 11 and the sensor 10.

In the preferred embodiment example shown in FIG. 1, a communication device 14 is provided. The communication device 14 is used to transmit information recorded by the sensor 10. In particular, the sensor 10 can be connected by wire to the communication device 14. The communication device 14 can be arranged externally from the mounting 8, as shown schematically in FIG. 1. The communication device 14 can preferably be designed in such a way that it evaluates the information recorded by the sensor 10 to monitor the condition of the conveyor belt 2, preferably in such a way that damage to the conveyor belt 2 can be detected by the communication device 14.

In further embodiments not shown in detail, it may also be provided that the communication device 14 is connected to an external server or an external cloud in which the corresponding evaluation of the measurement data recorded by the sensor 10 for belt damage detection can be carried out. The communication device 14 can then have corresponding transmission means for transmission to the server and/or the cloud, so that preferably wireless transmission can be ensured.

FIGS. 12 and 13 show that the system 1 can comprise a measuring device 15. For example, FIG. 13 shows a measuring roller that is part of the measuring device 15 and can be arranged underneath the conveyor belt 2, for example on the return section or on the underside of the conveyor belt section 25. Ultimately, the measuring device can be provided for detecting the speed of the conveyor belt 2, the running direction of the conveyor belt 2 and/or the position of the conveyor belt 2. The measuring roller can thus be used to determine the aforementioned variables by rotation of the roller.

With regard to the position of the conveyor belt 2, it can also be provided that the measuring device 15 has an indicator means 31, which is arranged on the conveyor belt 2, as shown in FIG. 12. This indicator means 31 can then interact with sensors of the measuring device 15 and thus be arranged in a specific section of the conveyor belt 2. If the speed of the conveyor belt 2 and the direction of rotation are known, it is possible to determine which position of the conveyor belt 2 is currently engaging the scraper segments 5, for example, and/or in which area the scraper segments 5 of the conveyor belt 2 are currently arranged.

The measuring device 15 can be designed with the communication device 14 for transmitting information recorded by the measuring device 15, as shown schematically in FIG. 10. Preferably, the communication device 14 is designed in such a way that information received from the measuring device 15 and from the sensor is linked together in the communication device 14 in such a way that the position of damage to the conveyor belt 2 can be detected. This is made possible by the fact that the information recorded by the sensor 10 can in turn determine when there is damage to the conveyor belt 2. The information recorded by the measuring device 15 then makes it possible to determine in which area of the conveyor belt 2 this damage is present. This can be done, for example, by determining the speed of the conveyor belt 2, the direction of travel and the position of the conveyor belt 2.

In particular, the measuring device 15 can have inductive sensors, which are preferably arranged on the measuring trap. In particular, these inductive sensors can interact with the indicator means 31, which is preferably a metal strip, and thus determine the position of this indicator means 31 on the conveyor belt 2.

FIG. 10 shows schematically that a control device 16 is provided. The control device 16 can be a component of the system 1. The control device 16 can be designed to control the conveyor belt system 2, with the communication device 14 being connected to the control device 16 in such a way that if damage to the conveyor belt 2 is detected, which can be done by the communication device 14, the control device 16 switches off the conveyor belt 2 and/or the conveyor belt system 3 and/or the scraper segment 5 on the conveyor belt 2 is released.

Furthermore, a manual coupling 19 can be provided, as shown in FIG. 4, among others. Using the manual coupling 19, the rotational position of the support shaft 4 and, in particular according to the illustrated and preferred embodiment example, also of the movement element 11 can be manually adjusted. In the respective set position, the relative rotational position can then be fixed in particular by means of the manual coupling 19. By actuating the manual coupling 19, the scraper segment 5 in the preferred embodiment shown in FIG. 4 can be positioned against the conveyor belt 2 and/or released from the conveyor belt 2 again.

The manual coupling 19 is also shown in more detail in FIGS. 6 to 8.

FIG. 1 also shows a drive for the support shaft 4. At least one drive element 20 of a drive engine 21 is provided, which is coupled to the support shaft 4, preferably at one end of the support shaft 4 in a torque-transmitting manner. It is not shown in more detail that a controller for the drive engine 21 can also be provided. Typically, such a control can be an electronic control, in particular with corresponding control software.

By controlling the drive engine 21 accordingly, the scraper segment 5 can be positioned with its scraper end 6 against the conveyor belt 2 or can be released from the conveyor belt 2—i.e. can be removed from the conveyor belt 2. The drive engine 21 can be arranged in a fixed or movable position on the mounting 8. In the embodiment example shown in FIG. 1, it is provided that the drive engine 21 is not arranged directly on the mounting 8, but can ultimately move relative to the mounting 8, but is mounted on it at least indirectly. The drive element of the drive engine 21 is coupled to the drive element 20, in particular in a suitable manner.

The drive engine 21 can be of any design, for example it can be a hydraulic or pneumatic drive engine. An electric drive engine 21 is preferred, and preferably an electric linear drive engine 21.

In principle, it is also conceivable to realize the present invention without a drive engine 21, in which case the scraper segment 5 can be positioned against the conveyor belt 2 by other means, for example manually.

In the illustrated and thus preferred embodiment example, it is provided that the manual coupling 19 is connected to the support shaft 4 in a rotationally fixed manner and to the drive element 20 in a manually adjustable and fixable manner. Using the coupling 19, a relative rotational position of the support shaft 4 and the drive element 20 of the drive engine 21 can be manually adjusted in relation to each other. For the non-rotatable connection of the manual coupling 19 to the support shaft 4, FIG. 4 shows that a multi-edge recess 30 as well as the manual coupling 19 and a fixing screw therein are provided. The fixing screw makes it possible to equip support shafts 4 of different sizes with one and the same manual coupling 19.

The manually adjustable and fixable connection of the manual coupling 19 with the drive element 20 is provided in the upper area slightly above the support shaft 4. For this purpose, according to the preferred teaching, it is provided here that the connection of the manual coupling 19 with the drive element 20 has a ratcheting mechanism 17 which can be adjusted in steps and a continuously variable fine adjustment 18. The semi-circular toothed arc of the ratcheting mechanism 17 can be seen and, above the toothed arc of the ratcheting mechanism 17, a index bolt 29 engaging from above in the ratcheting mechanism 17 at the corresponding point, which can be fixed to the drive element 20.

The index bolt 29 can ultimately be located in the ratcheting mechanism 17, as shown in FIG. 7. This fixes the relative position of the manual coupling 19 in relation to the drive element 20.

In the other figures, the index bolt 29 cannot be seen as it is covered by the drive element 20.

According to the preferred teaching, the manual coupling 19 can be operated by hand alone, i.e. without tools. A pull handle can be provided for this purpose, with which the index bolt 29 can be pulled upwards.

If the index bolt 29 is pulled upwards with the pull handle, it is disengaged from the ratcheting mechanism 17. The drive element 20 can then be pivoted. If the pull handle is then released again, the index bolt 29 is pressed back into the ratcheting mechanism 17 by means of spring force according to the preferred embodiment.

If the index bolt 29 is already placed in the ratcheting mechanism 17, fine adjustment 18 is still possible by means of the two adjustment screws on the left and right, which allow for a corresponding change. For example, if you want to swivel the drive element 20 to the left in relation to the support shaft 4, screw in the left screw of the fine adjustment 18 and unscrew the right screw; if you want to swivel to the right, do the opposite.

FIG. 11 shows a method according to the invention. According to the method, it is provided that the state of a conveyor belt 2 of a conveyor belt system 3 can be monitored. For this purpose, the method according to the invention provides that, in a first step A, a system 1 according to one of the aforementioned embodiments, as previously described in connection with FIGS. 1 to 10 and FIGS. 12 to 13, is first provided.

In process step B, it can then be provided that a characteristic variable of the movement element 11 is detected, as already discussed above.

In this context, in a first embodiment, it can be provided that during a movement of the movement element 11, the movement element 11 exerts a force on the sensor 10, in particular presses against the sensor 10 or pulls the sensor 10. This force can be detected by the sensor 10, in particular at least indirectly.

In a further, in particular alternative embodiment of method step B, a force exerted by the movement element 11 on the sensor 10 or a change in the position or angular orientation of the movement element 11 or an acceleration of the movement element 11 can be detected.

Alternatively or additionally, a deflection of the movement element 11 can be measured.

In step C, the speed of the conveyor belt 2, the running direction of the conveyor belt 2 or the position of the conveyor belt 2 can also be detected at least indirectly by the measuring device 15, in particular via the indicator means 31 and the measuring roller. The relevant information can preferably be transmitted to the communication device 14.

In step D, it is provided in particular that the communication device 14 expands the information recorded by the sensor 10 to monitor the condition of the conveyor belt 2, in particular in such a way that damage to the conveyor belt 2 can be detected by the communication device 14.

When evaluating the measurement data in step D, the communication device 14 can also link the information from the sensor 10 with the transmitted measurement data from the measuring device 15, so that in particular a detected belt damage can also be assigned a position on the conveyor belt 2.

If necessary, step E then provides for the scraper segment 5 to be released from the conveyor belt 2 if belt damage is detected, or for the conveyor belt system 3 to be switched off. However, such a shutdown should only be used if damage to the conveyor belt 2 has been detected. In method steps A to D and/or when carrying out the method, it may be provided that the support shaft 4 is moved in such a way that a surface of the scraper segment 5 is in contact with the conveyor belt 2.

As previously explained, FIG. 1 shows a section of a conveyor belt system 3 according to the invention with a conveyor belt 2 and a system 1 according to one of the aforementioned embodiments. The conveyor belt system 3 as such is also part of the present invention.

| List of reference symbols: | |
|---|---|
| 1 | System |
| 2 | Conveyor belt |
| 3 | Conveyor belt system |
| 4 | Support shaft |
| 4' | Support shaft |

-continued

| List of reference symbols: | |
|---|---|
| 5 | Scraper segment |
| 5' | Scraper segment |
| 6 | Scraper end |
| 7 | Adjusting device |
| 7' | Adjusting device |
| 8 | Mounting |
| 9 | Mounting bearing for 4 |
| 10 | Sensor |
| 11 | Movement element |
| 12 | Protrusion of 11 |
| 13 | Outer edge of 11 |
| 14 | Communication device |
| 15 | Measuring device |
| 16 | Control device |
| 17 | Ratcheting mechanism |
| 18 | Fine adjustment |
| 19 | Manual coupling |
| 20 | Drive element |
| 21 | Drive engine |
| 22 | Holding end |
| 23 | Return section |
| 24 | Conveyed material |
| 25 | Conveyor belt section |
| 26 | Deflection roller |
| 27 | Primary scraper |
| 28 | Secondary scraper |
| 29 | Index bolt |
| 30 | Multi-edge recess |
| 31 | Indicator means |
| X | Longitudinal axis of 4 |

The invention claimed is:

1. A system configured to detect damage to a conveyor belt of a conveyor belt system comprising:

a support shaft, the support shaft rotatably mounted, via at least one bearing, in a frame that is configured to be attached to the conveyor belt system, the support shaft rotatable about a longitudinal axis, at least one scraper segment attached to the support shaft, the at least one scraper segment also rotatable about the longitudinal axis, a movement element coupled to the support shaft, a sensor mounted to the frame, wherein the movement element is configured to convey rotational movement of the support shaft to the sensor, wherein the sensor is configured to detect the damage to the conveyor belt based on the rotational movement of the support shaft, and an adjusting device connected directly, or indirectly to the support shaft via the movement element, and configured to apply a pretension to the at least one scraper segment.

2. The system according to claim 1, wherein the adjusting device is movable in such a way that a surface of the scraper segment is brought into contact with the conveyor belt, wherein the adjusting device is arranged on the frame and is connected to the support shaft in a torque-transmitting manner and wherein the movement element is coupled to the adjusting device in terms of movement.

3. The system according to claim 1, wherein the sensor and the movement element are arranged and configured in such a way that when the movement element moves, the movement element exerts a force on the sensor.

4. The system according to claim 1, wherein the sensor is arranged and configured such that the sensor detects a force exerted on the sensor by the movement element.

5. The system according to claim 1, wherein the sensor is arranged and configured such that the sensor detects a change in the position or angular position of the movement element or an acceleration of the movement element.

6. The system according to claim 1, wherein the sensor comprises a strain gauge or is configured as a strain gauge, force sensor, piezoelectric sensor, potentiometer, angle sensor, acceleration sensor or magnetic proximity sensor.

7. The system according to claim 1, wherein the sensor is arranged in a stationary manner on the frame.

8. The system according to claim 1, wherein the movement element comprises a protrusion configured to interact with the sensor.

9. The system according to claim 1, wherein the system comprises a restoring mechanism which is arranged on the frame and exerts a restoring force on the movement element when the movement element is moved.

10. The system according to claim 1, wherein the system further comprises a communication device configured to transmit information detected by the sensor, which is arranged at a distance from the frame, and wherein the communication device evaluates information detected by the sensor for monitoring the condition of the conveyor belt.

11. The system according to claim 1, wherein the system comprises a measuring device configured to detect the speed of the conveyor belt, the running direction of the conveyor belt and/or the position of the conveyor belt, wherein the measuring device comprises a measuring roller arranged on the conveyor belt.

12. The system according to claim 11, wherein the measuring device is connected to a communication device and configured to transmit information detected by the measuring device, wherein the communication device is configured such that information received from the measuring device and from the sensor is connected to one another by the communication device such that the position of damage to the conveyor belt is detected.

13. The system according to claim 11, wherein the measuring device comprises a measuring roller, wherein inductive sensors of the measuring device are arranged on the measuring roller.

14. The system according to claim 1, wherein the system comprises a control device configured to control the conveyor belt system, wherein a communication device is connected to the control device in such a way that when damage to the conveyor belt is detected by the communication device, the control device switches off the conveyor belt and/or the conveyor belt system and/or releases the scraper segment from the conveyor belt.

15. A method for monitoring the condition of a conveyor belt of a conveyor belt system, comprising:
providing a system according to claim 1 and
detecting a characteristic value of the movement element.

16. The method according to claim 15, wherein during a movement of the movement element the movement element exerts a force on the sensor.

17. The method according to claim 15, wherein a force exerted by the movement element on the sensor, a change in the position or angular position of the movement element or an acceleration of the movement element is detected.

18. The method according to claim 15, wherein a communication device evaluates the information detected by the sensor for monitoring the condition of the conveyor belt, such that damage to the conveyor belt is detected by the communication device.

19. The method according to claim 15, wherein the measuring device detects the speed of the conveyor belt, the running direction of the conveyor belt and/or the position of the conveyor belt at least indirectly.

20. A conveyor belt system comprising a conveyor belt and a system according to claim 1.

* * * * *